(12) United States Patent
Komoll et al.

(10) Patent No.: US 8,297,648 B2
(45) Date of Patent: Oct. 30, 2012

(54) OCCUPANT RESTRAINT DEVICE

(75) Inventors: Olav Komoll, Berlin (DE); Rainer Heuschmid, Ulm (DE); Mathias Grube, Rüsselsheim (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/182,904

(22) Filed: Jul. 14, 2011

(65) Prior Publication Data
US 2011/0266780 A1    Nov. 3, 2011

Related U.S. Application Data

(63) Continuation of application No. PCT/EP2010/050324, filed on Jan. 13, 2010.

(30) Foreign Application Priority Data

Jan. 15, 2009 (DE) .......................... 10 2009 005 043

(51) Int. Cl.
*B60R 21/16* (2006.01)
(52) U.S. Cl. .................. 280/729; 280/730.1; 280/730.2
(58) Field of Classification Search ................. 280/729, 280/730.1, 730.2
See application file for complete search history.

(56) References Cited

U.S. PATENT DOCUMENTS

| | | | |
|---|---|---|---|
| 3,897,961 | A | 8/1975 | Leising et al. |
| 5,470,103 | A | 11/1995 | Vaillancourt et al. |
| 6,176,513 | B1 | 1/2001 | Neidert |
| 6,431,586 | B1 | 8/2002 | Eyrainer et al. |
| 2001/0038199 | A1 | 11/2001 | Fischer |
| 2004/0164528 | A1 | 8/2004 | Boegge et al. |
| 2005/0035577 | A1 | 2/2005 | Barko et al. |
| 2005/0156411 | A1 | 7/2005 | Steffens et al. |
| 2005/0275199 | A1* | 12/2005 | Helmstetter ............... 280/730.1 |
| 2006/0163848 | A1* | 7/2006 | Abe ............................. 280/729 |

FOREIGN PATENT DOCUMENTS

| | | |
|---|---|---|
| DE | 199 04 100 A1 | 8/2000 |
| DE | 203 12 596 U1 | 2/2004 |
| DE | 10 2005 001 177 A1 | 9/2005 |
| DE | 10 2005 001 597 A1 | 7/2006 |
| DE | 603 13 337 T2 | 1/2008 |
| DE | 10 2007 025 986 A1 | 12/2008 |
| EP | 0 832 795 A1 | 4/1998 |
| EP | 1 426 246 A1 | 6/2004 |
| EP | 1 541 426 A1 | 6/2005 |
| EP | 1 607 273 A1 | 12/2005 |
| WO | WO-2006/074773 A1 | 7/2006 |

OTHER PUBLICATIONS

International Preliminary Report on Patentability in PCT/EP2010/050324 dated Jul. 28, 2011.
International Search Report in PCT/EP2010/050324 dated Apr. 9, 2010.

* cited by examiner

*Primary Examiner* — Eric Culbreth
(74) *Attorney, Agent, or Firm* — Foley & Lardner LLP

(57) ABSTRACT

An occupant restraint device for a motor vehicle is provided. The occupant restraint device includes a first airbag which is inflatable with gas to protect an occupant who occupies a seat in the form of a driver's seat or a front passenger seat of the motor vehicle as intended, wherein the first airbag is designed to be arranged in a steering wheel or an instrument panel of the motor vehicle in a non-inflated state, and a second airbag, which can be inflated with gas to protect the occupant. The second airbag is designed such that an edge area thereof facing the vehicle front extends along the A-pillar of the motor vehicle in an inflated state.

14 Claims, 5 Drawing Sheets

OCCUPANT RESTRAINT DEVICE

CROSS-REFERENCE TO A RELATED APPLICATION

This application is a continuation of International Patent Application Number PCT/EP2010/050324, filed on Jan. 13, 2010, (published as WO 2010/081811), and claims priority to DE Appln No: 10 2009 005 043.4, filed Jan. 15, 2009. The foregoing international application and priority application are incorporated by reference herein.

BACKGROUND

The invention relates to an occupant restraint device for a motor vehicle and a method for triggering such an occupant restraint device.

Such an occupant restraint device comprises usually a first airbag, which is inflatable with gas to protect an occupant, who occupies a seat in form of a driver seat or a front passenger seat of a motor vehicle as intended, wherein the first airbag is arranged and provided to be arranged in a steering wheel or an instrument panel of the motor vehicle in a non-inflated state, and a second airbag, which is inflatable with gas to protect the occupant.

In case of a frontal/angular impact, the danger exists that the head of the occupant to be protected collides in the triangular area, in which the A-pillar, the windscreen and the roof frame adjoin each other, with the A-pillar, in particular if the A-pillar extends very far in the direction of the occupant. This results in excessive neck torques and neck pressure forces. Overhanging A-pillars are mainly used in cabriolets/roadsters.

SUMMARY

The object of the invention is therefore to improve an occupant restraint device in view of the previously mentioned problems in order to avoid the mentioned disadvantages.

According to an exemplary embodiment of the invention, it is provided that the second airbag is designed such that said airbag extends with an edge area thereof facing the vehicle front along the A-pillar of the motor vehicle.

This has in principle the effect that in case of an angular impact the head of the occupant slides along the second airbag instead of knocking against the A-pillar in said area.

The second airbag is exemplary arranged and provided such that said airbag rests with the said edge area against the A-pillar in the inflated state. The second airbag is thereby in particular arranged and provided to rest with its edge area in the inflated state against an edge area of the inflated first airbag extending along the vertical vehicle axis and facing the lateral motor vehicle body such that the first and second airbag cover at least section wise together the A-pillar from the occupant.

Control electronics are exemplary provided for triggering gas generators assigned to the airbags, wherein said electronics interact with a sensor means, which can comprise a multitude of singular different sensors.

The sensor means serves to record a force acting on the front of the motor vehicle due to a collision, wherein said force is orientated along a force direction. Thereby the sensor means is exemplary arranged and provided to record the inclination of said force direction relative to the motor vehicle longitudinal axis. The sensor means can comprise for this an evaluation unit, which translates the corresponding signals of singular sensors to said inclination. The control electronics triggers then the gas generators depending on said inclination (angle between force direction and vehicle longitudinal axis). The inclination is 0° in case of a frontal impact and 90° in case of an angular impact.

In an exemplary variant of the invention the control electronics are arranged and provided to trigger the first as well as the second gas generator for inflating the two airbags, if the sensor means records a collision, in which the inclination of the force direction relative to the vehicle longitudinal axis is smaller or equal 30°. Thereby, the control electronics is in particular designed to trigger the first and the second gas generator at the same time or at a time shift, so that the two assigned airbags are inflated if possible at one point in time or points in time, which guarantees a protection of the occupant.

An occupant restraint device according to the invention is thus preferably designed to effect a protection in case of a frontal impact with angular component, wherein in particular a simultaneous activation of front and side airbags (first and second airbag as well as optionally third airbag) is provided. Furthermore, such an occupant restraint device can be arranged and provided to offer protection in case of a side impact with frontal component, wherein in particular a simultaneous activation of front and side airbags (first and second airbag as well as optionally third airbag) is provided. The angle relative to the vehicle longitudinal axis (impact angle) is up to approximately 30° (see above). A further idea of the invention is in particular to trigger the airbags or to arrange the airbags in the motor vehicle such that the occupant is protected in case of a crash from potentially dangerous contact with elements of the vehicle (interior space).

In an exemplary embodiment, the second airbag is designed to be arranged in a non-inflated state in a lateral motor vehicle door assigned to the seat, in particular below a window parapet or a window section of said motor vehicle door.

In a further exemplary embodiment, a third airbag is provided which is designed to be arranged in the seat in the non-inflated state, and namely in particular in the area of a backrest sidewall of the seat facing said door, wherein the third airbag is preferably designed to extend along the motor vehicle in an inflated state. The third airbag can thereby provide a thorax and/or pelvis protection for the occupant. The second airbag is preferably provided to protect the head and extends accordingly in the height of the head of an occupant to be protected in front of the window of the lateral motor vehicle door.

The control electronics is preferably arranged and provided to trigger a third gas generator assigned to the third airbag for inflating the third airbag, if the sensor means records a collision, in which the inclination of the force direction relative to the vehicle longitudinal axis is smaller or equal to 30°.

In this manner, in particular in the case of an angular impact, the second airbag (for instance integrated into the door, and in particular in the form of a head airbag) and the third airbag (in particular in the form of a side airbag integrated into the seat) are activated together with the first airbag arranged in the steering wheel or the instrument panel so that, instead of a contact of the head with the A-pillar, the head slides along the second airbag. Due to the ignition of the side safety system (second and optionally third airbag), a reduction of the lateral movement of the occupant is achieved, which favours the effect of sliding past the A-pillar.

The object according to the invention is furthermore solved by a method for triggering an occupant restraint device. Subsequently, it is provided: Recording the angle between a force direction of a force acting on a vehicle front of the motor vehicle due to a collision and the vehicle longitudinal axis, wherein in case of an inclination smaller or equal 30°, the first and the second airbag are inflated.

In case of an angle smaller or equal 30°, additionally a further third airbag is preferably inflated, which is arranged in the seat in a non-inflated state, in particular in a backrest sidewall, so that the third airbag extends along the motor vehicle door in the inflated state and namely between the occupant and said door.

BRIEF DESCRIPTION OF THE DRAWINGS

Further advantages and features of the invention become apparent by means of the following description of the figures of examples.

DETAILED DESCRIPTION

Figure 1:
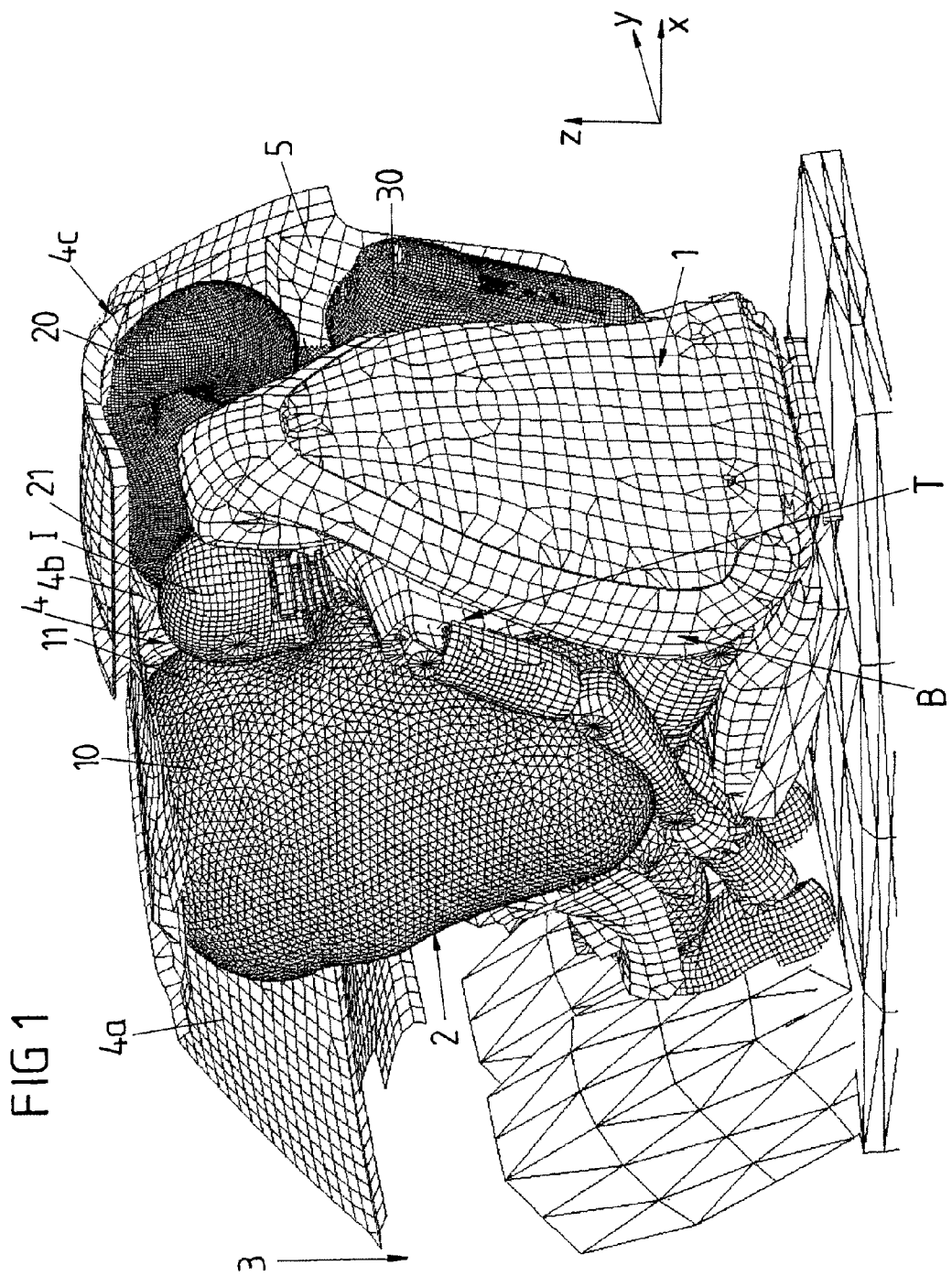
FIG. 1 shows a perspective view of an occupant restraint device according to the invention.
Figure 2:
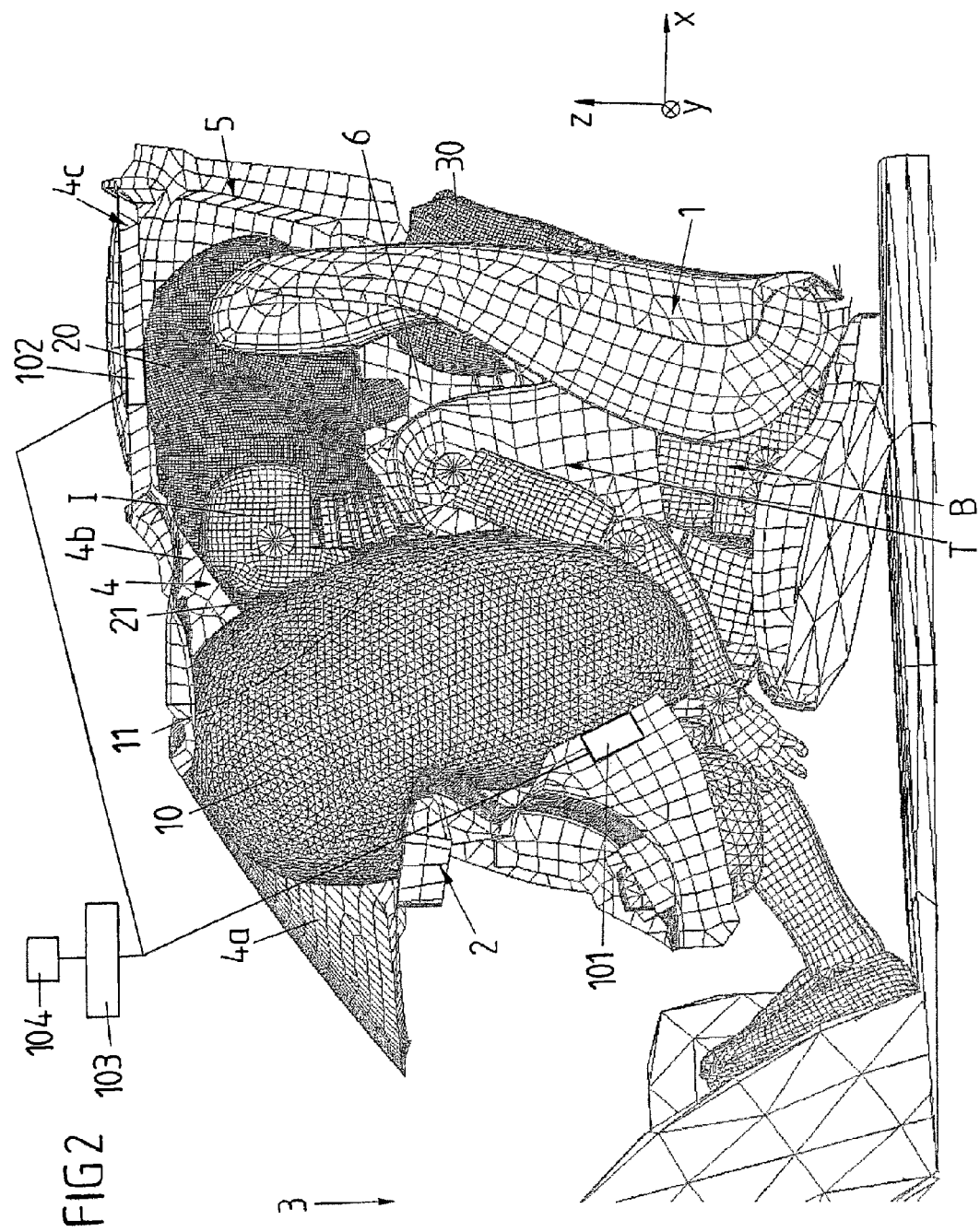
FIG. 2 shows a perspective view of an occupant restraint device according to FIG. 1.
Figure 3:
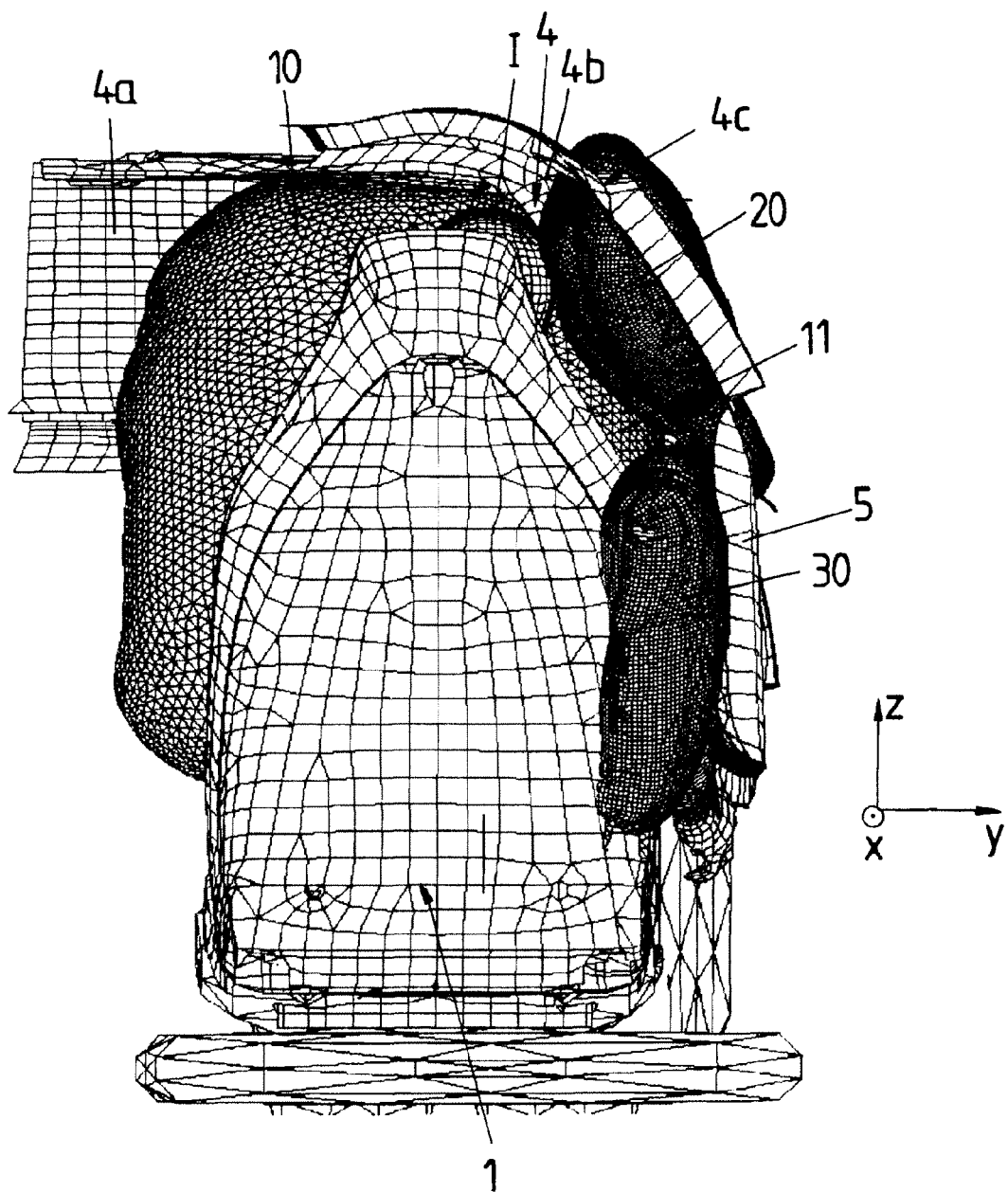
FIG. 3 shows a perspective view of an occupant restraint device according to FIG. 1.
Figure 4:
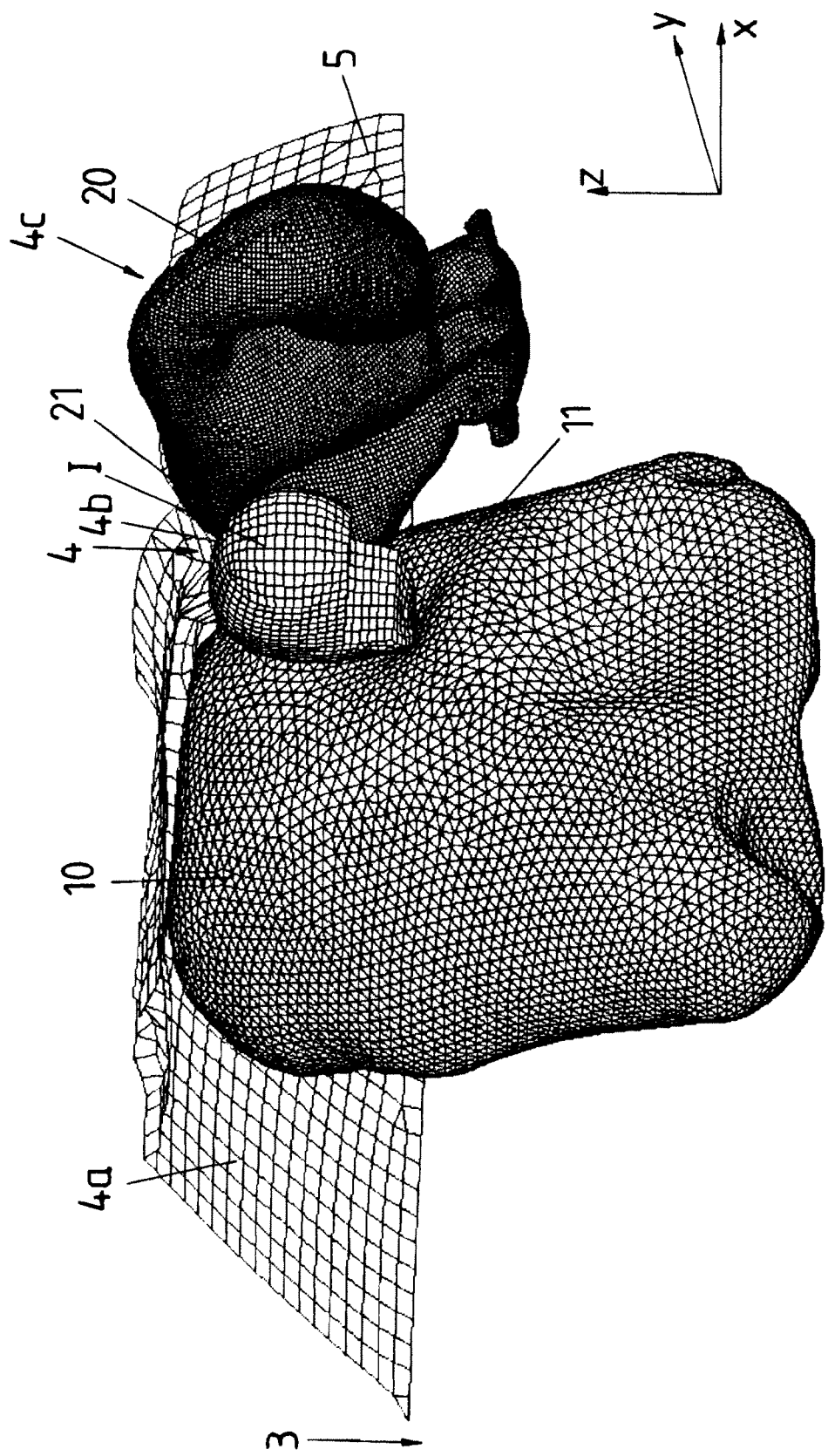
FIG. 4 shows a perspective view of an occupant restraint device according to FIG. 1.

FIG. 1 shows in combination with the FIGS. 2 to 4 perspective views of an occupant restraint device 1 according to the invention.

The FIGS. 1 to 4 show an occupant I, which occupies a seat 1 in the form of a front passenger seat as intended such that a motor vehicle door 5 continues along the motor vehicle cross axis y adjacent to the occupant I along the x-z plane, to which an A-pillar 4 is adjacent along the vehicle longitudinal axis x, wherein said A-pillar is arranged along the vehicle longitudinal axis x in front of the occupant I. A front wind screen 4a is adjacent to said A-pillar 4 along the vehicle cross axis y, wherein said wind screen faces the occupant I along the vehicle longitudinal axis x. A roof spar 4c diverts along the vehicle longitudinal axis x from an upper end 4b of the A-pillar (relative to the vertical vehicle axis z), wherein said roof spar continues above the motor vehicle door 5.

In case of a frontal impact, in particular in case of an angular impact, the danger exists, that the occupant I slides past a singular first airbag 10 in form of a head airbag, which is unfolded out of an instrument panel 2 in order to absorb energy of the occupant I along the vehicle longitudinal axis x, and collides against a section of the A-pillar 4 which extends along the windscreen 4a towards the roof spar 4c.

Therefore, in case of an angular impact at least a second airbag 20 is activated at the same time or with a time shift depending on the time course of the occupant movement in order to prevent this. Said second airbag comprises in the inflated state an edge area 21 continuing along the A-pillar 4, wherein said edge area nestles as tightly as possible against the A-pillar 4. Thus, it is achieved that the occupant I can slide along the second airbag 20 so that said occupant strikes the first airbag 10 and not the A-pillar 4 extending angularly behind thereof.

According to one embodiment of the present invention, a third airbag 30 can optionally be used, which can be a side airbag integrated into a seat, which can be for instance designed to protect the thorax T and/or the pelvis B of the occupant I. This said airbag 30 extends preferably therefore in the z-x plane between the occupant I and said motor vehicle door 5.

FIG. 2 also shows control electronics 103 designed to trigger a first gas generator 101 assigned to the first airbag 10 for inflating the first airbag 10 and a second gas generator 102 assigned to the second airbag 20 for inflating the second airbag 20; and a sensor means 104 for recording the force acting on the vehicle front of the motor vehicle along a force direction due to a collision, wherein the sensor means 104 is in particular designed to record the inclination of the force direction relative to the vehicle longitudinal axis. The control electronics 103 is arranged and provided to trigger the first gas generator 101 and the second gas generator 103 for inflating the two airbags 10 and 20, when the sensor means 104 records a collision, in which the inclination of the force direction relative to the vehicle longitudinal axis is smaller than or equal to 30°.

Figure 5:
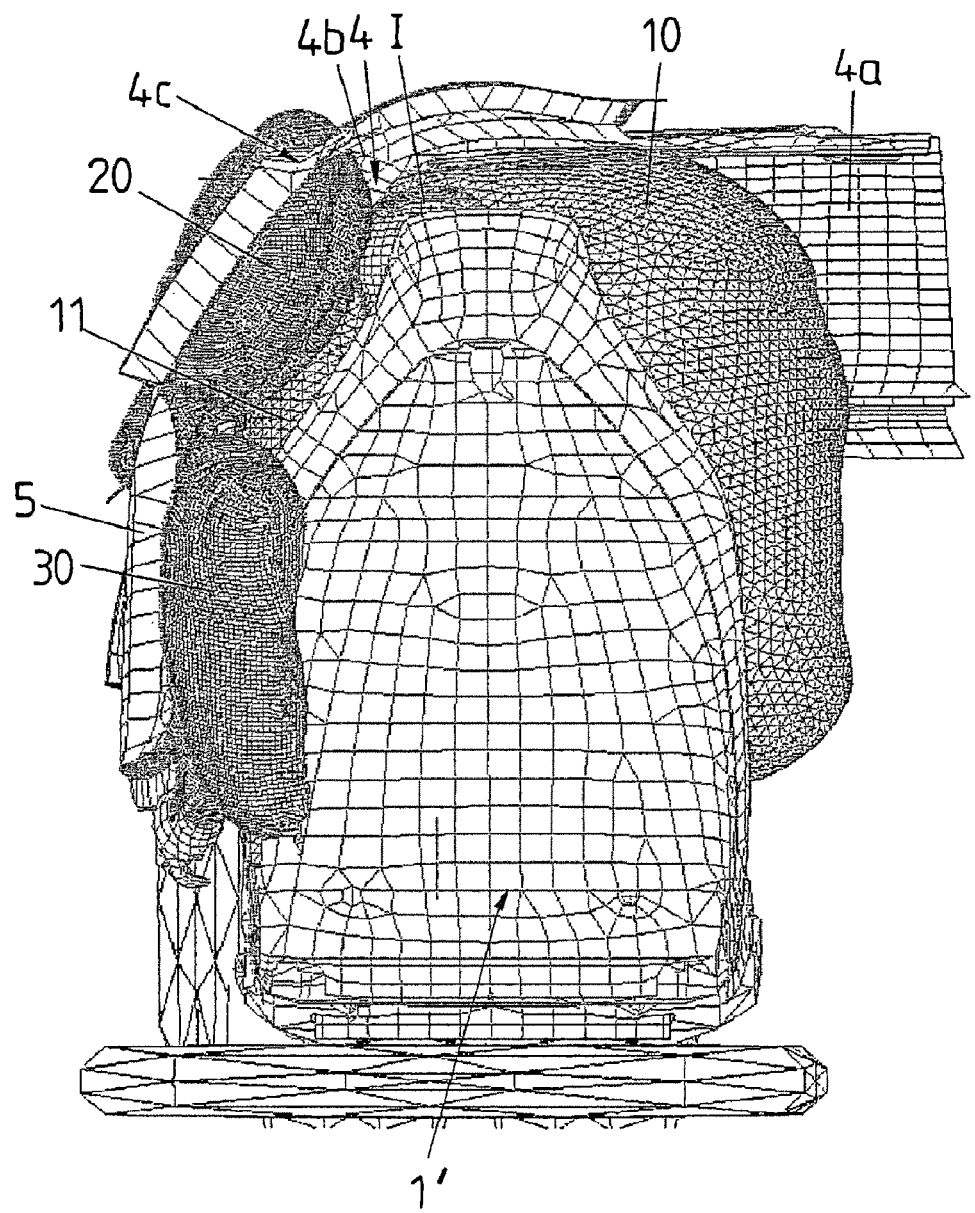
FIG. 5 shows a perspective view of an occupant restraint device according to an embodiment of the present invention for a driver's seat.

According to one embodiment of the present invention shown in FIG. 5, an occupant restraint device may comprise a first airbag 10, which is inflatable with gas to protect an occupant I who occupies a seat in the form of a driver's seat 1'. In this case, the first airbag 10 is designed to be arranged in a steering wheel in its non-inflated state. A second airbag 20 is inflatable to protect the occupant I, wherein the second airbag is designed such that the second airbag 20 extends with an edge area thereof facing the vehicle front in an inflated state along the A-pillar 4. The second airbag comprises in the inflated state an edge area continuing along the A-pillar 4, wherein the edge area nestles tightly against the A-pillar so that the occupant I can slide along the second airbag so that the occupant I strikes the first airbag 10 and not the A-pillar 4 extending angularly behind thereof. The second airbag 20 is arranged and adapted to rest with its edge area in the inflated state against an edge area of the inflated first airbag 10 extending along the vertical vehicle axis and facing the lateral motor vehicle body.

The priority application, German Patent Application Number 10 2009 005 043.4; filed on Jan. 15, 2009 is incorporated by reference herein.

The invention claimed is:

1. An occupant restraint device for a motor vehicle comprising:
   a first airbag, which is inflatable with gas to protect an occupant who occupies a driver's seat or a front passenger seat of the motor vehicle, wherein the first airbag is designed to be arranged in a steering wheel or an instrument panel of the motor vehicle in its non-inflated state, and
   a second airbag, which is inflatable to protect the occupant, wherein the second airbag is designed such that said second airbag extends with an edge area thereof facing a vehicle front in an inflated state along an extending angularly A-pillar of the motor vehicle,
   wherein the second airbag in the inflated state extends along a lateral vehicle body,
   wherein the second airbag comprises in the inflated state said edge area continuing along the A-pillar,
   wherein said edge area nestles tightly against the A-pillar so that the occupant can slide along the second airbag so that said occupant strikes the first airbag and not the A-pillar extending angularly behind thereof, and
   wherein the second airbag is arranged and adapted to rest with its edge area in the inflated state against an edge area of the inflated first airbag extending along a vertical vehicle axis and facing the lateral motor vehicle body.

2. The occupant restraint device according to claim 1, wherein the second airbag is designed such that said edge area of the second airbag rests against the A-pillar in the inflated state.

3. The occupant restraint device according to claim 1, wherein the second airbag is designed such that said second airbag rests with the edge area thereof against the edge area of the inflated first airbag extending along the vertical vehicle axis in the inflated state such that the first airbag and the second airbag cover together at least sectionally the A-pillar for protecting the occupant.

4. The occupant restraint device according to claim 1, further comprising control electronics designed to trigger a first gas generator assigned to the first airbag for inflating the first airbag and a second gas generator assigned to the second airbag for inflating the second airbag.

5. The occupant restraint device according to claim 4, further comprising a sensor means for recording a force acting on the vehicle front of the motor vehicle along a force direction due to a collision, wherein the sensor means is designed to record an inclination of said force direction relative to a vehicle longitudinal axis.

6. The occupant restraint device according to claim 5, wherein the control electronics are arranged and provided to trigger the first and second gas generators for inflating the first and second airbags, when the sensor means records a collision, in which the inclination of the force direction relative to the vehicle longitudinal axis is smaller than or equal to 30°.

7. The occupant restraint device according to claim 6, wherein the control electronics are designed to trigger the first gas generator and the second gas generator at the same time.

8. The occupant restraint device according to claim 6, wherein the control electronics are designed to trigger a third gas generator assigned to a third airbag for inflating the third airbag, when the sensor means record a collision, in which the inclination of the force direction relative to the vehicle longitudinal axis is smaller than or equal to 30°.

9. The occupant restraint device according to claim 6, wherein the control electronics are designed to trigger the first gas generator and the second gas generator with a time shift.

10. The occupant restraint device according to claim 1, wherein the second airbag is designed to be arranged in a non-inflated state in a lateral motor vehicle door assigned to the seat below a window parapet of said motor vehicle door.

11. The occupant restraint device according to claim 1, further comprising a third airbag, which is designed to be arranged in the seat in a non-inflated state, wherein the third airbag is designed to extend along a motor vehicle door in an inflated state.

12. An occupant restraint device for a motor vehicle comprising:
a first airbag, which is inflatable with gas to protect an occupant who occupies a driver's seat or a front passenger seat of the motor vehicle, wherein the first airbag is designed to be arranged in a steering wheel or an instrument panel of the motor vehicle in its non-inflated state,
a second airbag, which is inflatable to protect the occupant, wherein the second airbag is designed such that said second airbag extends with an edge area thereof facing a vehicle front in an inflated state along an A-pillar of the motor vehicle, wherein the second airbag in the inflated state extends along a lateral vehicle body,
control electronics designed to trigger a first gas generator assigned to the first airbag for inflating the first airbag and a second gas generator assigned to the second airbag for inflating the second airbag, and
a sensor means for recording a force acting on the vehicle front of the motor vehicle along a force direction due to a collision, wherein the sensor means is designed to record an inclination of said force direction relative to a vehicle longitudinal axis,
wherein the control electronics are arranged and provided to trigger the first and second gas generators for inflating the first and second airbags, when the sensor means records a collision, in which the inclination of the force direction relative to the vehicle longitudinal axis is smaller than or equal to 30°.

13. A method for triggering an occupant restraint device containing control electronics, comprising:
recording an inclination of a force direction of a force acting on a vehicle front of a motor vehicle due to a collision relative to a vehicle longitudinal axis, wherein the occupant restraint device further comprises: a first airbag, which is inflatable with gas to protect an occupant who occupies a driver's seat or a front passenger seat of the motor vehicle, wherein the first airbag is designed to be arranged in a steering wheel or an instrument panel of the motor vehicle in its non-inflated state, and a second airbag, which is inflatable to protect the occupant, wherein the second airbag is designed such that said second airbag extends with an edge area thereof facing the vehicle front in an inflated state along an extending angularly A-pillar of the motor vehicle, wherein the second airbag in the inflated state extends along a lateral vehicle body, wherein the second airbag comprises in the inflated state said edge area continuing along the A-pillar, wherein said edge area nestles tightly against the A-pillar so that the occupant can slide along the second airbag so that said occupant strikes the first airbag and not the A-pillar extending angularly behind thereof, wherein the second airbag is arranged and adapted to rest with its edge area in the inflated state against an edge area of the inflated first airbag extending along a vertical vehicle axis and facing the lateral motor vehicle body,
in case of an inclination smaller than or equal to 30°, inflating the first and the second airbags based on a trigger from the control electronics of the occupant restraint device.

14. The method according to claim 13, wherein in case of an inclination smaller than or equal to 30°, a third airbag is inflated, which is arranged in the seat in a non-inflated state, wherein the third airbag extends along a motor vehicle door in an inflated state.

* * * * *